United States Patent
Kutko et al.

(10) Patent No.: US 11,216,877 B2
(45) Date of Patent: Jan. 4, 2022

(54) AUTOMATED ELECTRONIC TRADE MATCHING SYSTEMS AND METHODS

(71) Applicant: Electronifie Inc., New York, NY (US)

(72) Inventors: Stefan Kutko, New York, NY (US); Amar Kuchinad, New York, NY (US); Ian McAllister, New York, NY (US)

(73) Assignee: Electronifie, Inc., New York, NY (US)

( * ) Notice: Subject to any disclaimer, the term of this patent is extended or adjusted under 35 U.S.C. 154(b) by 0 days.

(21) Appl. No.: 16/422,226

(22) Filed: May 24, 2019

(65) Prior Publication Data

US 2019/0279302 A1 Sep. 12, 2019

Related U.S. Application Data

(63) Continuation of application No. 15/092,990, filed on Apr. 7, 2016, now Pat. No. 10,346,914.

(60) Provisional application No. 62/144,056, filed on Apr. 7, 2015.

(51) Int. Cl.
*G06Q 40/04* (2012.01)
*G06Q 40/06* (2012.01)

(52) U.S. Cl.
CPC ............. *G06Q 40/04* (2013.01); *G06Q 40/06* (2013.01)

(58) Field of Classification Search
CPC ........ G06Q 10/00; G06Q 20/00; G06Q 30/00; G06Q 40/00; G06Q 40/04; G06Q 40/06
USPC ...................................................... 705/3–44
See application file for complete search history.

(56) References Cited

U.S. PATENT DOCUMENTS

| | | | | |
|---|---|---|---|---|
| 7,565,313 B2* | 7/2009 | Waelbroeck | ....... | G06Q 30/0251 700/99 |
| 7,769,657 B2* | 8/2010 | Chacko | .................. | G06Q 30/06 705/35 |
| 7,840,480 B2 | 11/2010 | Kim-E | | |
| 7,882,017 B2 | 2/2011 | Howorka et al. | | |
| 8,332,301 B2* | 12/2012 | Iyer | ........................ | G06Q 40/06 705/36 R |
| 8,346,651 B2* | 1/2013 | Freitas | .................... | G06Q 40/00 705/37 |
| 8,380,612 B2* | 2/2013 | Hanson | .................. | G06Q 20/10 705/36 R |
| 8,577,778 B2* | 11/2013 | Lange | .................... | G06Q 30/08 705/35 |

(Continued)

FOREIGN PATENT DOCUMENTS

WO WO 2018102819 * 6/2018

OTHER PUBLICATIONS

Inci et al.. "Intraday behavior of stock prices and trades around insider trading", Financial Management 39.1: 323(41). Fianancial Management Association, April-June (Year: 2010).*

*Primary Examiner* — Frantzy Poinvil

(74) *Attorney, Agent, or Firm* — Goodwin Procter, LLP

(57) ABSTRACT

Embodiments of the present invention may provide users with an automated electronic trade matching system for orders to buy and sell fixed income instruments. Embodiments of the present invention may incentivize subscribers to enter unbiased, executable orders in their maximum desired size while discouraging and taming predatory behavior. Embodiments of the present invention may prevent individual subscriber order information from being revealed to other parties unless needed to facilitate the execution and clearance/settlement of subscriber orders or required by law or regulation.

14 Claims, 18 Drawing Sheets

(56) References Cited

U.S. PATENT DOCUMENTS

| | | | |
|---|---|---|---|
| 8,660,943 B1* | 2/2014 | Chirehdast | G06Q 40/00 |
| | | | 705/38 |
| 9,504,470 B2* | 11/2016 | Milliman | A61B 17/07292 |
| 9,747,643 B1* | 8/2017 | Givot | G06Q 30/08 |
| 9,929,743 B1* | 3/2018 | Acuna-Rohter | H04L 51/18 |
| 10,152,240 B2* | 12/2018 | Kavanagh | H04L 47/805 |
| 10,535,092 B2* | 1/2020 | Noviello | G06Q 30/0633 |
| 10,592,976 B1* | 3/2020 | Givot, I | G06Q 30/08 |
| 10,692,144 B2* | 6/2020 | Konduru | G06Q 40/04 |
| 2002/0095369 A1 | 7/2002 | Kaplan et al. | |
| 2008/0154764 A1* | 6/2008 | Levine | G06Q 40/04 |
| | | | 705/37 |
| 2010/0114752 A1* | 5/2010 | Downs | G06Q 40/04 |
| | | | 705/37 |
| 2010/0185562 A1* | 7/2010 | Nafeh | G06Q 40/00 |
| | | | 705/36 R |
| 2012/0221453 A1 | 8/2012 | Howes et al. | |
| 2013/0166475 A1* | 6/2013 | Packles | G06Q 40/06 |
| | | | 70/36 R |
| 2014/0214646 A1* | 7/2014 | Sweeting | G06Q 40/04 |
| | | | 705/37 |
| 2015/0073967 A1* | 3/2015 | Katsuyama et al. | |
| 2015/0356678 A1* | 12/2015 | Schmitt | G06Q 40/04 |
| | | | 705/37 |
| 2016/0055581 A1* | 2/2016 | Katsuyama et al. | |
| 2018/0262455 A1* | 9/2018 | Acuna-Rohter | H04L 67/32 |
| 2018/0276751 A1* | 9/2018 | Kavanagh | H04L 69/16 |
| 2019/0279302 A1* | 9/2019 | Kutko | G06Q 40/04 |
| 2019/0340673 A1* | 11/2019 | Noviello | G06Q 40/04 |
| 2020/0065163 A1* | 2/2020 | Kavanagh | G06F 9/546 |

\* cited by examiner

100

AUTOMATED ELECTRONIC TRADE MATCHING SYSTEMS AND METHODS

RELATED APPLICATION

This application is a continuation of, and claims priority to, U.S. Utility application Ser. No. 15/092,990, filed Apr. 7, 2016, now U.S. Pat. No. 10,346,914, entitled "Automatic Electronic Trade Matching Systems and Methods," which claimed priority to U.S. Provisional Application No. 62/144,056, filed Apr. 7, 2015, also entitled "Automatic Electronic Trade Matching Systems and Methods." The contents of these related applications are incorporated by reference herein in their entireties.

FIELD OF THE INVENTION

Embodiments of the present invention relate generally to automated electronic trade matching systems and methods for orders to buy and sell fixed income instruments, and in particular, relate to an improved bond trading system and method that facilitates the completion of trades using dynamic positions and offsets.

BACKGROUND OF THE INVENTION

Conventionally, the trade of corporate bond securities in the marketplace is difficult and inefficient. If an institutional investor wanted to trade corporate bond securities, he or she would have to contact bond market banks to assist in completing a trade. Then the bank, for instance, would manually locate an interested party willing to place a bid for the securities in question. The bank, in these cases, effectively operates as a matchmaking party. Unlike publicly-traded stocks, there is no public market, such as the New York Stock Exchange (NYSE), through which parties may efficiently trade corporate bond securities. As a result, it is not only difficult to locate two parties that are interested in trading the same corporate bond security, but also who are also willing to trade a particular number of securities at a fair market price.

Indeed, without a public market (exchange), it is extremely difficult to ascertain the true fair market prices for a given security. Because trades are created through a manual, private process between two private parties, there is no transparency in the marketplace, making it further difficult for trades to be completed. Furthermore, interested parties are disincentivized from revealing too much information to other parties in the marketplace out of fear that it would lead to bias or predatory behavior. For example, if a party reveals that he/she is interested in selling a certain security, other parties who gain this information can engage in predatory behavior with respect to that security.

Even if there were a public marketplace for corporate bond securities, many institutional investors do not have the time to track the market value of particular securities throughout a given day. There remains no viable solution that allows for trades to be completed automatically between two parties at a fair, optimal price while keeping the confidentiality of the parties.

Another shortcoming of prior solutions was the difficulty in locating interested traders in the marketplace, thereby further disincentivizing trades. There remained no central location through which bids and offers may be publicly provided to all interested parties. Thus, even if an institutional investor were interested in placing bids for certain securities, there was no solution that can facilitate the identification of bonds that the trader would likely be interested in, e.g., based on previous transactions, user-definable parameters, and other information.

In view of the foregoing, there are significant problems and shortcomings associated with currently available trading solutions, especially those in the market for corporate bond securities. Accordingly, the inventors recognized a need in the art for an automated electronic trade system to facilitate security trades in a variety of transaction types while maintaining party confidentialities.

SUMMARY OF THE INVENTION

Embodiments of the present invention may provide an electronic trading system. The electronic trading system may include a computer memory storing data and instructions, a network interface for communicating with at least two subscribers over a communication network, and at least one computer processor. The at least one computer processor may execute instructions stored in the computer memory to perform the steps of: receiving a first set of order parameters for a security transaction from a first subscriber device; storing the first set of order parameters in the computer memory; separating the first set of order parameters into a first subset and a second subset; transmitting the first subset of the order parameters to a second subscriber device over the communication network while maintaining the second subset of the order parameters in the computer memory; receiving a second set of order parameters from the second subscriber device; in response to receiving the first and second set of order parameters, automatically instructions to execute a transaction between the first and second subscribers; transmitting a notification to the first and second subscriber devices over the communication network, the notification allowing access to information about the executed transaction; receiving a selection from the first or second subscriber device regarding the executed transaction; and transmitting information about the executed transaction to display on the first or second subscriber device.

Embodiments of the present invention may provide a user device. The user device may include an input device to enter order parameters, designating a first subset of the order parameters to be shared with other subscribers and a second subset of the order parameters not to be shared with other subscribers. The user device may also include a communication interface to transmit the order parameters with the subset designations to a trading server over a network, and to receive a notification from the trading server over the network. The user device may further include a display to display the notification, which includes a customized link to a network location with information about a transaction with another subscriber regarding the transmitted order parameters.

Embodiments of the present invention may provide a computer-implemented method for executing a security transaction. The method may include: receiving a first set of order parameters for a security transaction from a first subscriber device; storing the first set of order parameters in the computer memory; separating the first set of order parameters into a first subset and a second subset; transmitting the first subset of the order parameters to a second subscriber device over the communication network while maintaining the second subset of the order parameters in the computer memory; receiving a second set of order parameters from the second subscriber device; in response to receiving the first and second set of order parameters, automatically instructions to execute a transaction between the first and second subscribers; transmitting a notification to the first and second subscriber devices over the communication network, the notification allowing access to information about the executed transaction; receiving a selection from the first or second subscriber device regarding the executed transaction; and transmitting information about the executed transaction to display on the first or second subscriber device.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

DETAILED DESCRIPTION OF THE INVENTION

Embodiments of the present invention may provide users with an automated electronic trade matching system for orders to buy and sell fixed income instruments.

Embodiments of the present invention may generate block-sized liquidity in the corporate securities market by providing traders with execution mechanisms that limit information leakage and help to establish best-execution parameters. Embodiments of the present invention may incentivize subscribers to enter unbiased, executable orders in their maximum desired size while discouraging and taming predatory behavior. Embodiments of the present invention may prevent individual subscriber order information from being revealed to other parties unless needed to facilitate the execution and clearance/settlement of subscriber orders or required by law or regulation.

Embodiments of the present invention may be applicable with respect to various types of securities, including, but not limited to debt securities (e.g., corporate bonds, government bonds, money market instruments, etc.); equity securities (e.g., common stock, preferred stock); derivative securities (e.g., forwards, futures, options, swaps, collateralized debt obligations, credit default swaps, and mortgage-backed securities, etc.), and any hybrids. These securities may be traded on any primary or secondary markets. In one embodiment, the system facilitates the trading of corporate bond securities. For instance, all bond securities designated for trading may be eligible for odd-lot, round-lot, and mixed-lot executions.

Figure 1:
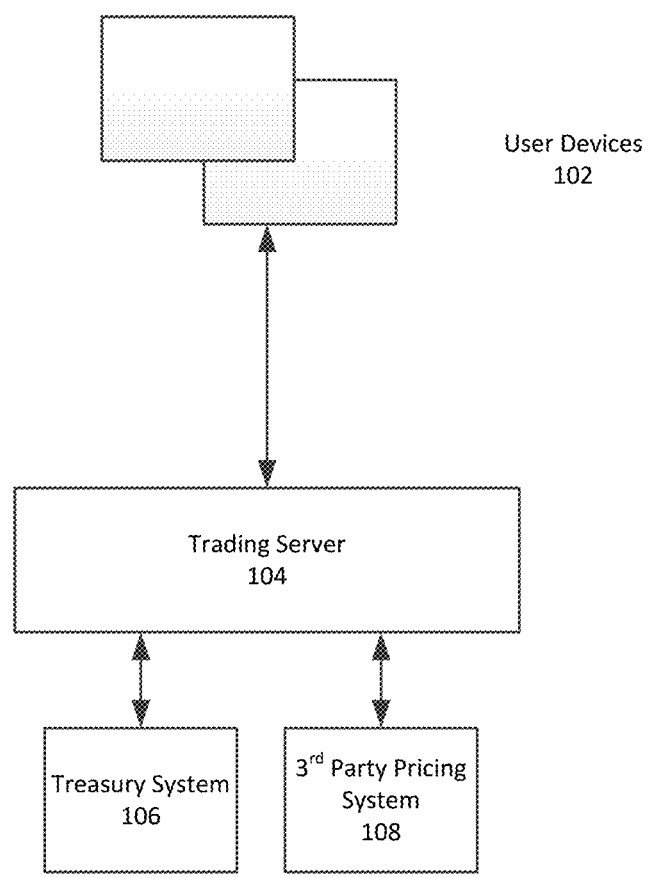
FIG. 1 is a block diagram illustrating an operating environment for an electronic trading system in accordance with an embodiment of the present invention.

FIG. 1 is a block diagram illustrating an operating environment for operation of an electronic trading system 100 in accordance with an embodiment of the invention. The electronic trading system 100 may include a plurality of user devices 102, a trading server 104, a treasury system 106, and a third party pricing system 108. Additional systems or devices may be included in the operating environment.

The user devices 102 may be provided as a computing device such as a computer, laptop, tablet, etc. The user devices 102 may also be provided as mobile devices including, but not limited to, mobile smartphones, such as Android® phones and iPhones®, tablets, or hand-held wireless devices such as PDAs, multiprocessor systems, microprocessor-based or programmable consumer electronics, minicomputers, other handheld devices that may now be available or may in the future become available. These user devices 102 may utilize a downloadable app supplied by the trading server 104 for use in conjunction with the electronic trading system.

The user devices 102 may be communicatively connected to the trading server 104 via a communication link. The communication link may be provided by one or more networks, such as the Internet. The network may include may include a wired or wireless local area network (LAN) and a wide area network (WAN), wireless personal area network (PAN) and other types of networks. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

The trading server 104 may interact with the plurality of user devices 102 and may manage transactions between the user devices 102 in accordance with embodiments of the present as further explained herein. The trading server 104 may be communicatively connected to the treasury system 106 to receive treasury information that may be relevant to particular transactions. The trading server may be communicatively connected to the third party pricing system 108 to receive relevant pricing information to particular transactions.

Figure 2:
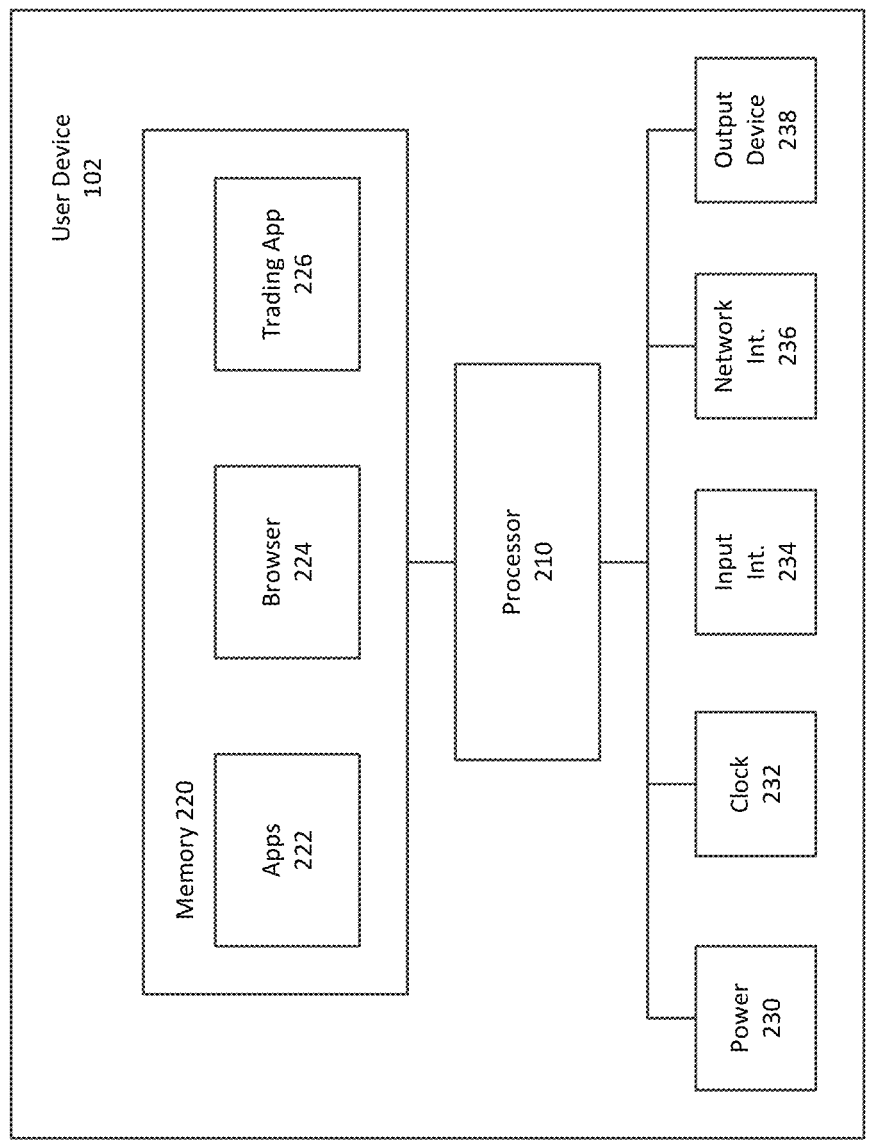
FIG. 2 is a block diagram of a user device in accordance with an embodiment of the present invention.

FIG. 2 illustrates a user device 102 in accordance with an embodiment of the invention. The user device 102 may include a processor 210 and a memory 220. The memory 220 may include, for example, applications 222, a browser 224, and a trading application 226. The processor 210 may also be connected to additional components, either stored in a memory or installed as separate hardware components, such as a power source 230, a clock 232, an input interface 234, a network interface 236, and output devices 238.

In embodiments of the invention, users may be required to subscribe to the electronic trading system in order to use the trading application 226. The electronic trading system may link to financial accounts of the subscriber, and therefore the use of a subscription facilitates processing for transactions.

The user device 102 may interact with the electronic trading system 100 using a browser 224 to access a electronic trading system website as will be further described below. Alternatively, the user device 102 may interact with the electronic trading system 100 using a mobile application. In embodiments of the invention, the trading application may cause the subscriber user device to access one or more URLs from the electronic trading system website. In an embodiment, the trading application may provide the ability to automatically take actions based on notifications or other pushed data.

Figure 3:
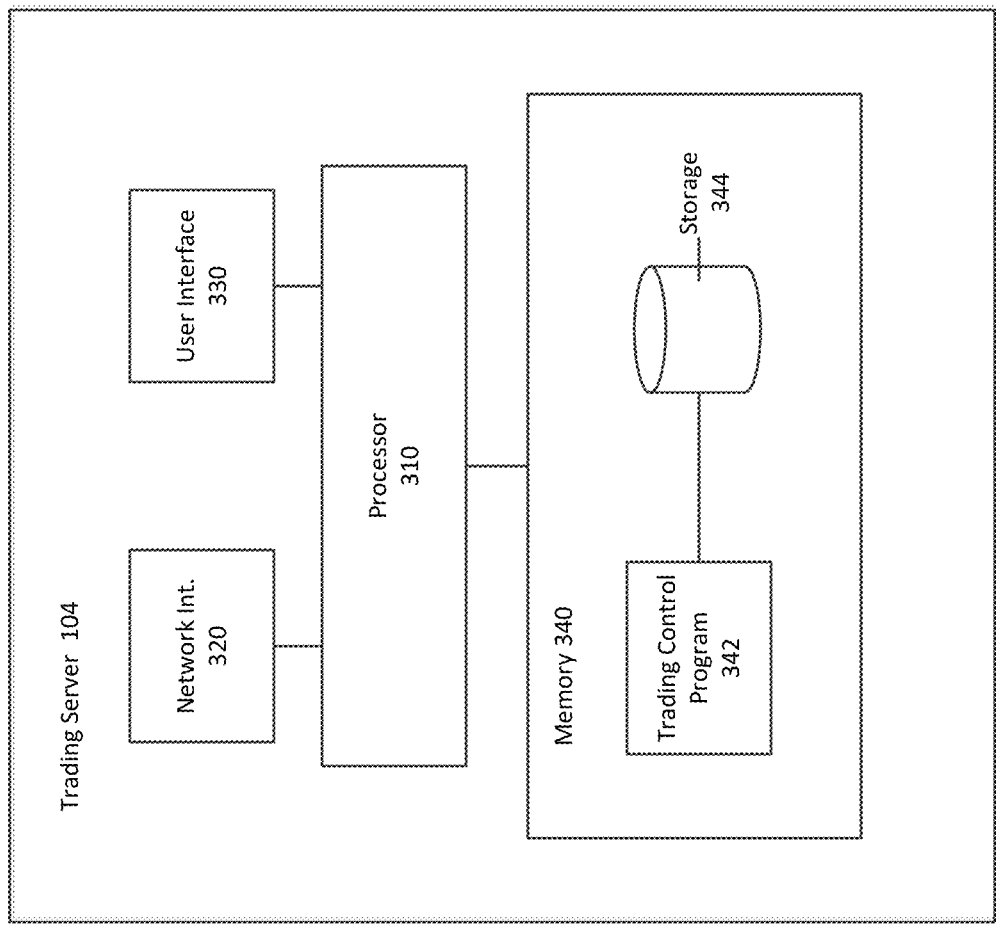
FIG. 3 is a block diagram of a trading server in accordance with an embodiment of the present invention.

FIG. 3 illustrates a trading server 104 in accordance with an embodiment of the present invention. The trading server 104 may include a processor 310, a network interface 320, a user interface, 330, and a memory 340. The network interface 320 may be used for communicating with the electronic trading system 100 and other systems over a network, and the user interface 330 may allow viewing and input directly by a vendor of the electronic trading system 100. The memory 340 may include a trading control program 342 connected with a storage element 344. The processor 310 may execute various transaction algorithms from the trading control program 342 as will be further described below. The storage element 344 may store data gathered from the various sources described above with respect to FIG. 1, such as from user devices 102. This data may be structured, semi-structured, or unstructured. The data storage areas may include file systems and databases for storing large amounts of data. Data stored in the storage element 344 may be managed and communicated with an Object-Relational Database Management System, as known in the art. The storage element 344 may include multiple data storage areas, which may have different structures and store different types of data. For example, unstructured data may be stored separately from cleansed and structured data.

Embodiments of the present invention provide a marketplace to a plurality of subscribers to facilitate the completion of trades using an application protocol interface (API) on the user devices 102 (of FIG. 1) to connect to an exchange. For instance, subscribers may connect a web subscriber portal through a user interface application. Through the user interface, users may perform any number of functions including: view trading hours and support contacts; view relevant System documentation; view counterparty credit limits and balances; view a list of authorized users, their roles, and their associated trading desks; view the trading limits for each of those trading desks; and view the Subscriber's orders and trades. Users designated by the Subscriber as an administrator are additionally able to add and remove authorized counterparties and set credit limits for each of them; add and remove authorized users and specify their roles on the System; and manage trader, desk, and firm credit limits.

Figure 4A:
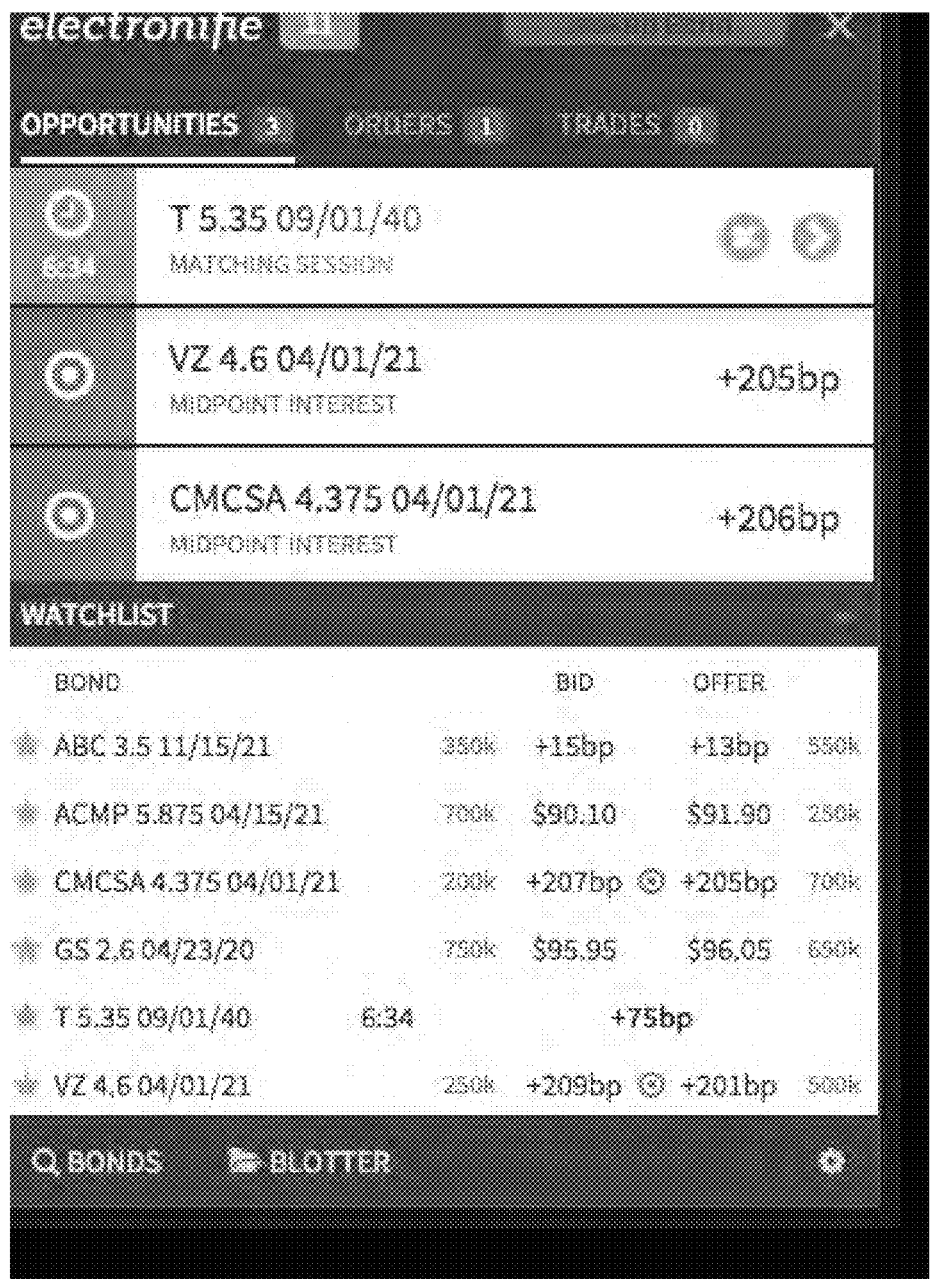
FIGS. 4A-C is diagram of a user interface in accordance with embodiments of the present invention.
Figure 4B:
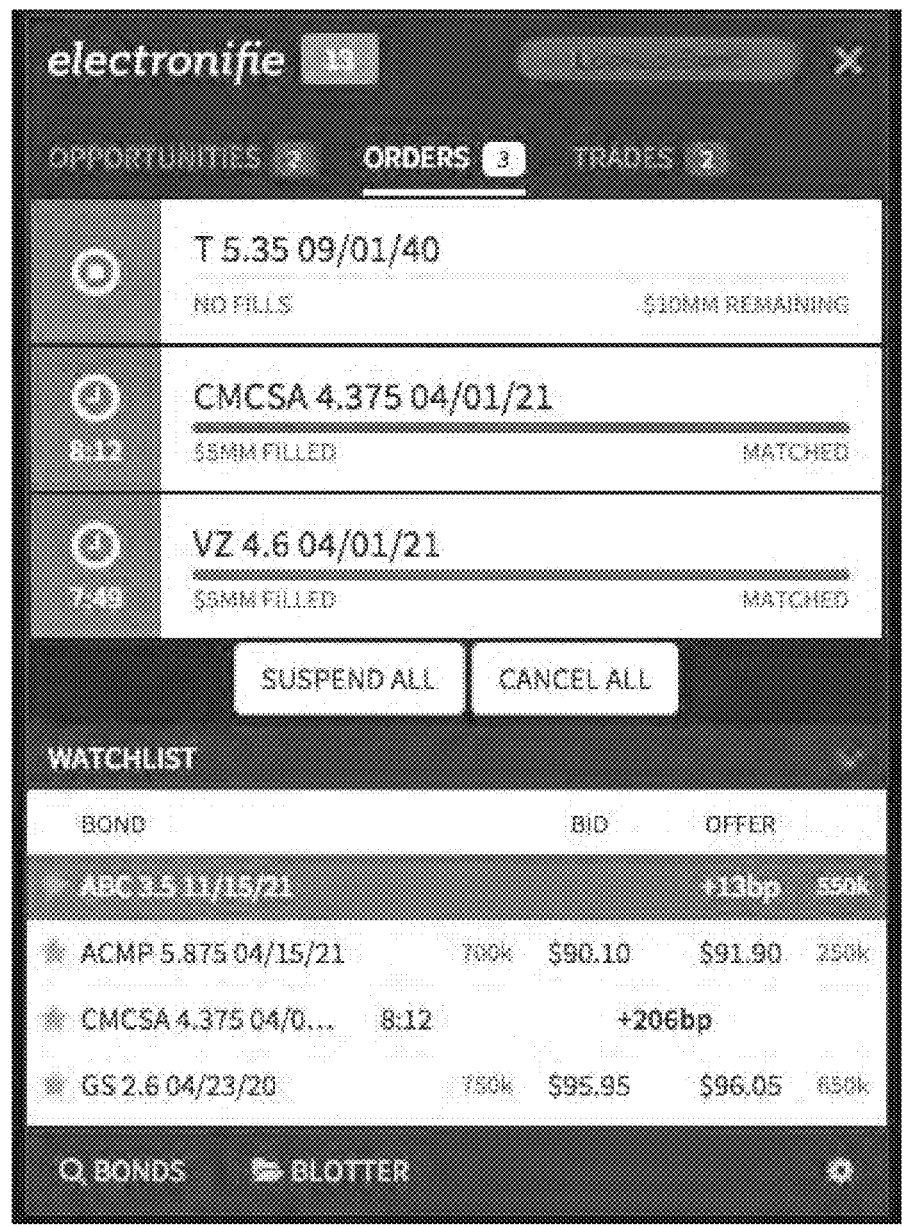
Figure 4C:
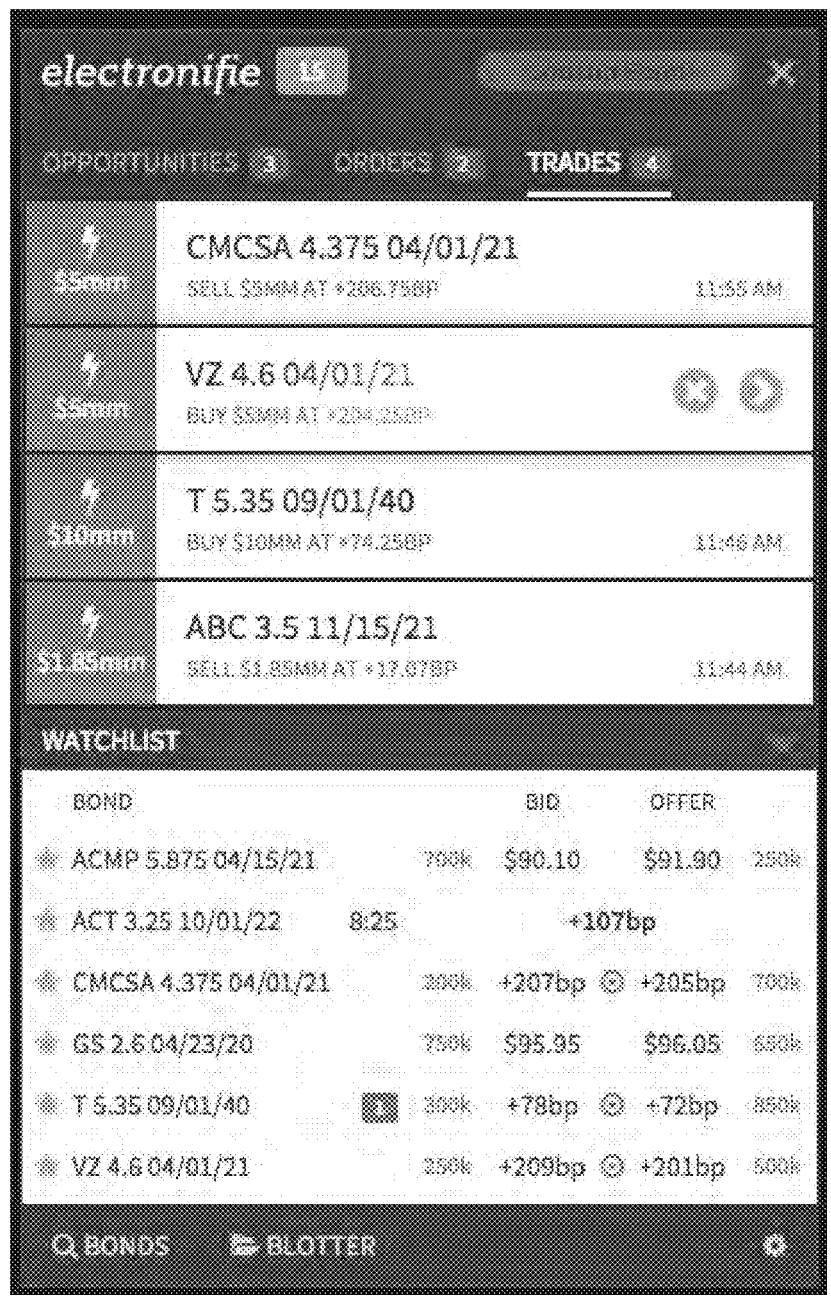

FIGS. 4A-C illustrate a user interface for subscribers in accordance with an embodiment of the present invention. In this embodiment, the user interface may include an opportunities tab; an orders tab; a trades tab; a blotter; and a watchlist. As shown in FIG. 4A, the opportunities tab may provide users with the bids and offers that are available in the marketplace and available with the system. In one embodiment, the user interface may provide offers and bids that are greater than $1 million (or other value set by the system, subscriber or administrator). Thus, these allow institutional bankers to quickly identify high-value offers and bids. The opportunities tab may also provide a subscriber with available bids or offers that may be of interest to the subscriber based on the subscriber's current bids and offers; previous offers, bids, trades; watchlist; or other parameters or attributes. In one embodiment, the user may also be shown matching sessions that are currently active, including the time remaining before expiration. The watchlist provided in the user interface may be configured by the subscriber or administrator and may show the bonds of interest to the subscriber. Thus, this feature provides subscriber with quick access to relevant information, including currently available bids, offers, and the quantity. A blotter may provide user prompts that are based on the activity of other users.

As shown in FIG. 4B, the Orders tab, for example, may depict all active orders and allow a subscriber to suspend or cancel all orders. As shown in FIG. 4C, the trades tab may provide a list of all of the subscriber's executed trades and all active trades of particular bonds.

Figure 5:
FIG. 5 is a diagram of a search interface in accordance with an embodiment of the present invention.

Embodiments of the present invention may also provide a searching function so that the subscriber may search for particular security(ies). FIG. 5 illustrates a searching pane of a user interface in accordance with an embodiment of the present invention. The searching pane may include a fields area 510 and a results area 520. The fields area 510 may include a one or more search fields such as sector, industry, issuers, time range, price, etc. The results area 520 may include a listing of results of the current search.

Embodiments of the present invention may also suggest to subscribers via the user interface particular bid(s) or offer(s) that may be of interest to the subscriber. For instance, a subscriber may be notified that an order has been entered for a security has one or more characteristics similar to the security(ies) that the subscriber has had or has current interest in. In one embodiment, the subscriber may have the ability to fine tune opportunities displayed to them by enabling or disabling characteristics through which similar trading opportunities are presented.

Figure 6:
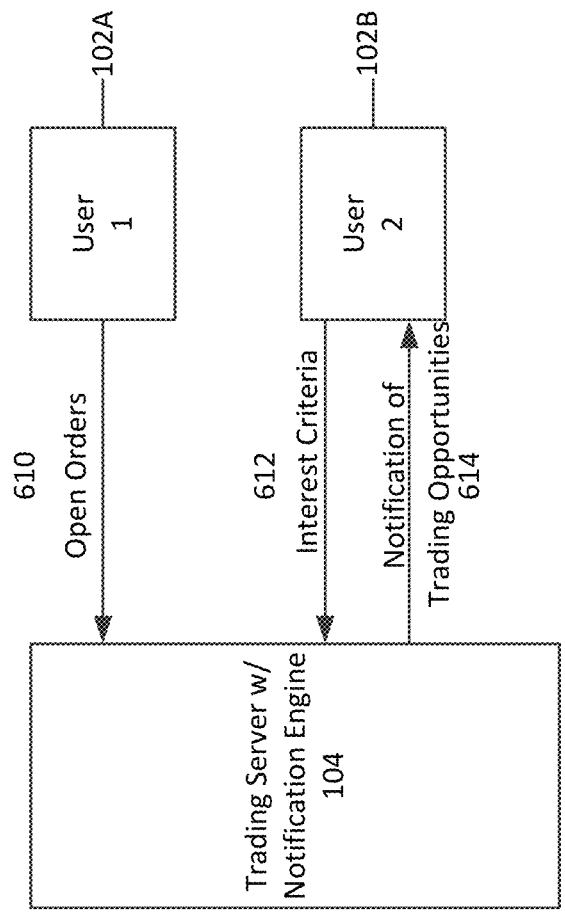
FIG. 6 is a block diagram illustrating a notifications method in accordance with an embodiment of the present invention.

FIG. 6 illustrates a diagram of a notification technique that provides a dynamic notification feature in accordance with an embodiment of the present invention. FIG. 6 depicts a User 1 102a, a User 2 102b, and a trading server 104. The trading server 104 may include a notification engine. In the provided example, the notification engine utilizes data relating to the bonds (or other securities) of interest specified by the subscriber of the system. The notification engine may also collect bond reference data. In step 610, User 1 102a (and other users) may provide information regarding active orders. In step 612, User 2 102b may provide criteria that may be of interest to that subscriber. In an embodiment, a user profile may be created based on preferences of the subscriber and the subscriber's activity history. For instance, the user may specify her preferences such as a list of specific bonds she is interested in trading, specific bonds that she is interested in monitoring, and other criteria (e.g., maturity, industry sectors, credit rating, size of order) that is of interest.

In step 614, the trading server's notification engine may compare attributes of securities of interest specified by a User 2 102b with one or more attributes of securities involved in one or more open orders entered by other users (e.g., User 1 102a) in the trading system. For instance, the attribute information collected and considered by the notification engine may include information relating to the issuer, issuer industry, maturity/duration, credit rating, yield/spread/price information, benchmark government bond information, and other relevant information available.

When the notification engine detects an order that may be of interest to User 2 102b, the subscriber may be automatically notified of the trading opportunities, such as in the Opportunities tab of the user interface, as described above in FIG. 4A. In another embodiment of the present invention, the subscriber may be notified through other means, such as through email, text messages, or chat messages. The notification may include a unique URL containing selections on the trading website, wherein selection of the URL may open the subscriber trading application on the user device and allow the subscriber to view available selections on the trading website. These notifications may be received when the subscriber is offline and may bring the subscriber online through selection of the uniquely generated URL. In an embodiment, the notifications may be asynchronous push messages to the user devices.

Embodiments of the present invention may facilitate a variety of transaction types including, but not limited to, midpoint ordering, limit ordering, auction ordering, and matching session ordering. To facilitate the completion of trades, including in an automated and dynamic fashion, embodiments of the present invention may provide subscribers with the capability to complete trades using dynamic mid-market positions and offsets. Specifically, embodiments of the present invention facilitate the creation and completion of orders to buy or sell a specified quantity of a security at a level better than or equal to a specified offset to the current arithmetic average of the best bid and best offer for that security. These orders may be referred herein as "Midpoint Orders," and the calculated average value of the best (highest) bid and best (lowest) offer for a particular security may be referred herein as a "System Mid."

Figure 7:
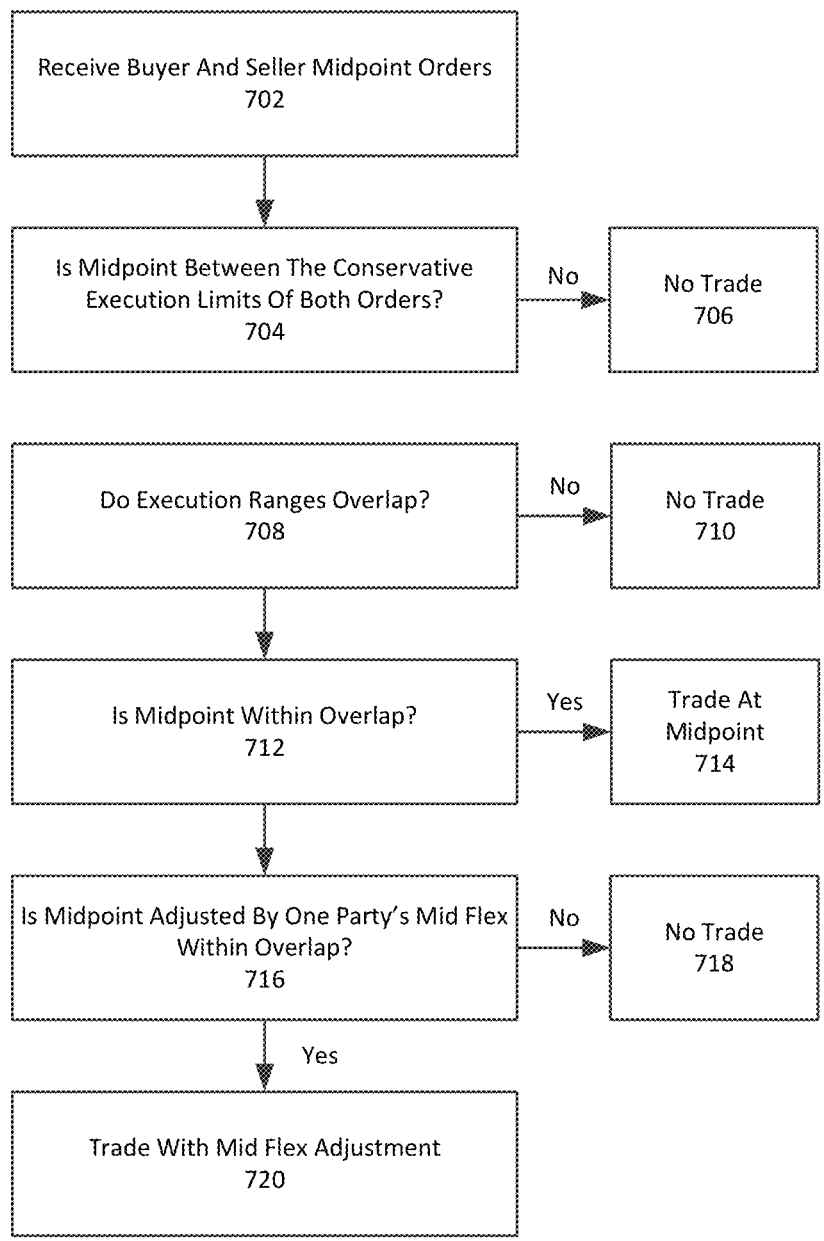
FIG. 7 is a flow diagram illustrating a midpoint ordering method in accordance with an embodiment of the present invention.

FIG. 7 illustrates a flow diagram of a midpoint ordering method in accordance with an embodiment of the present invention. In step 702, the trading server may receive buyer and seller midpoint order parameters. Each party's Midpoint Order, for instance, may specify, among other things, the security, the quantity, and execution limits. The execution limits, in one embodiment, may define the price range at which the party is willing to buy or sell the security.

To limit information leakage and help to establish best-execution parameters, the system may secure the information provided by subscribers to incentivize subscribers to enter unbiased, executable orders in their maximum desired size while discouraging and taming predatory behavior. The system may prevent individual subscriber order information from being revealed to other parties unless needed to facilitate the execution and clearance/settlement of subscriber orders or required by law or regulation. For example, the trading sever may store the order parameters information and separate the order parameters into two subsets: a first subset that may be shared with other subscribers, and a second subset that may be held confidential and not be shared with other subscribers. For example, the first subset, which will be shared with other subscribers, may include only the existence of the order or show the Side of the order or the like, while the second subset, which will not be shared, may include the remaining information. In an embodiment, the first subscriber may choose what order parameters may be shared or, alternatively, the system may select what parameters may be shared based on a preselected criteria.

In an embodiment, a user interface may assist a subscriber with entering a Midpoint Order in accordance with an embodiment of the present invention. For example, the user interface allows a subscriber to define an order (e.g., buy or sell), order type (e.g., limit or midpoint), size, quantity, increment, and/or mid flex parameter. In addition, the user interface may include an interactive tool that allows the subscriber to define the subscriber's execution limits, as well as the current market mid for the given security. The user interface may also include, the current best bid, offer, and mid; the current limit order depth, treasury benchmark details, and all active orders for the selected security. After entry of the order, the subscriber may be provided with a midpoint order entry confirmation user interface. The user interface may also inform the subscriber of what information will be shared and what information will not be shared with other subscribers.

Figure 8A:
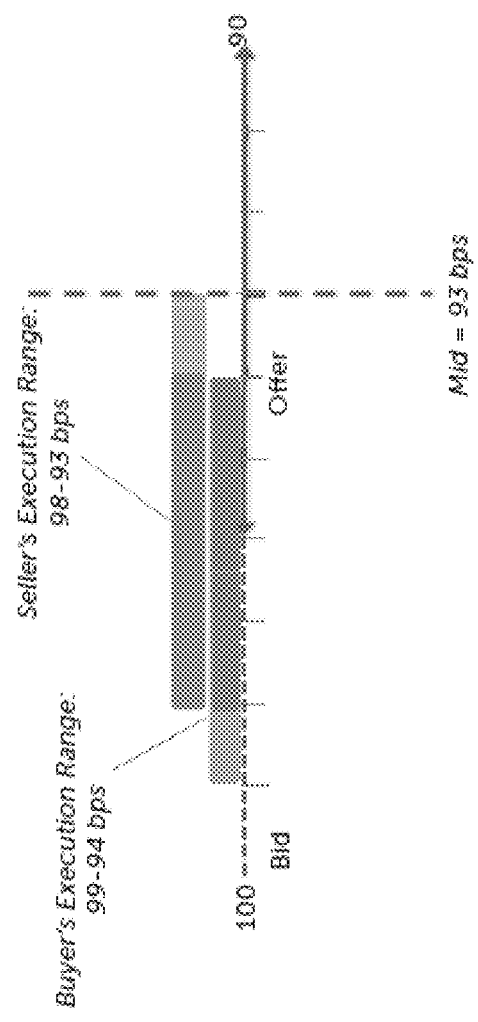
FIGS. 8A-F are illustrations of example scenarios of midpoint ordering in accordance with embodiments of the present invention.

In step 704, the trading server may determine whether the System Mid (midpoint) is between the conservative execution limits of both orders (bid/offer). If not, no trade is executed in step 706. An example of this scenario is illustrated in FIG. 8A. Here, the buyer's execution range is 99-94 bps, and the seller's execution range is 98-93 bps. The current market is 96/90 bps; therefore, the System Mid is 93 bps. Because the System Mid does not fall between the execution limits of both orders, no trade is executed. An appropriate notification may then be sent to the subscribers alerting them that no trade was executed.

Figure 8B:
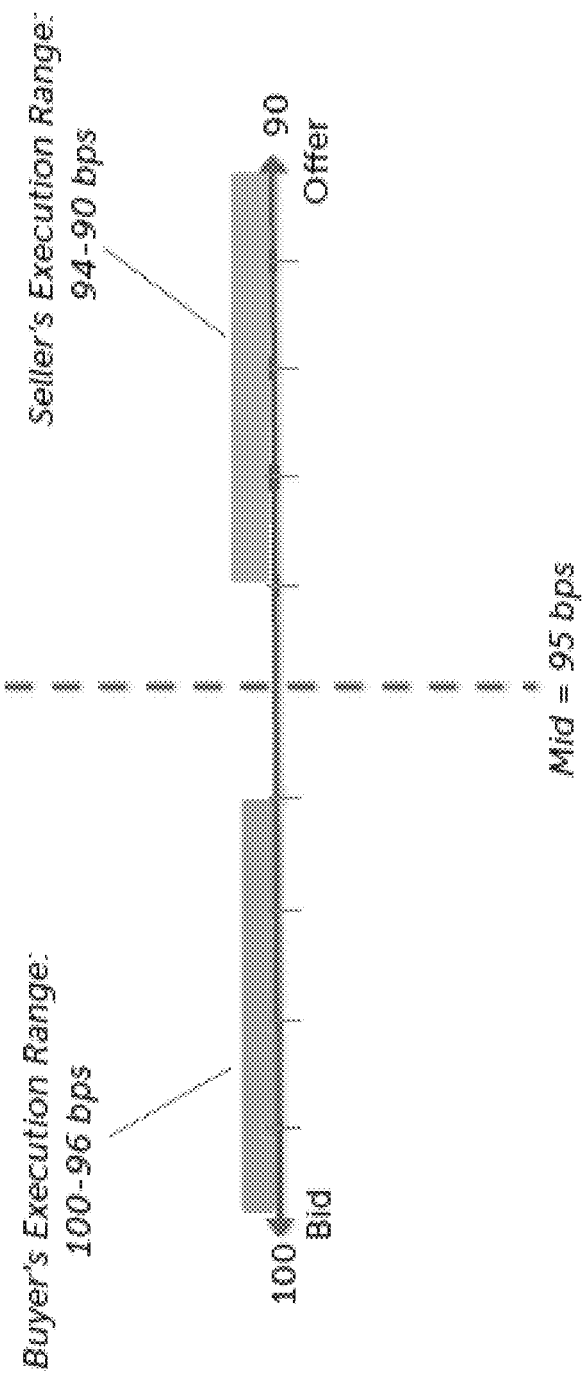

Returning to FIG. 7, the trading server may also determine whether the execution ranges overlap in step 708. If not, no trade is executed in step 710. An example of this scenario is illustrated in FIG. 8B. Here, the buyer's execution range is 100-96 bps, and the seller's execution range is 94-90 bps. Because the execution ranges do not overlap, no trade is executed. An appropriate notification may then be sent to the subscribers alerting them that no trade was executed.

Figure 8C:
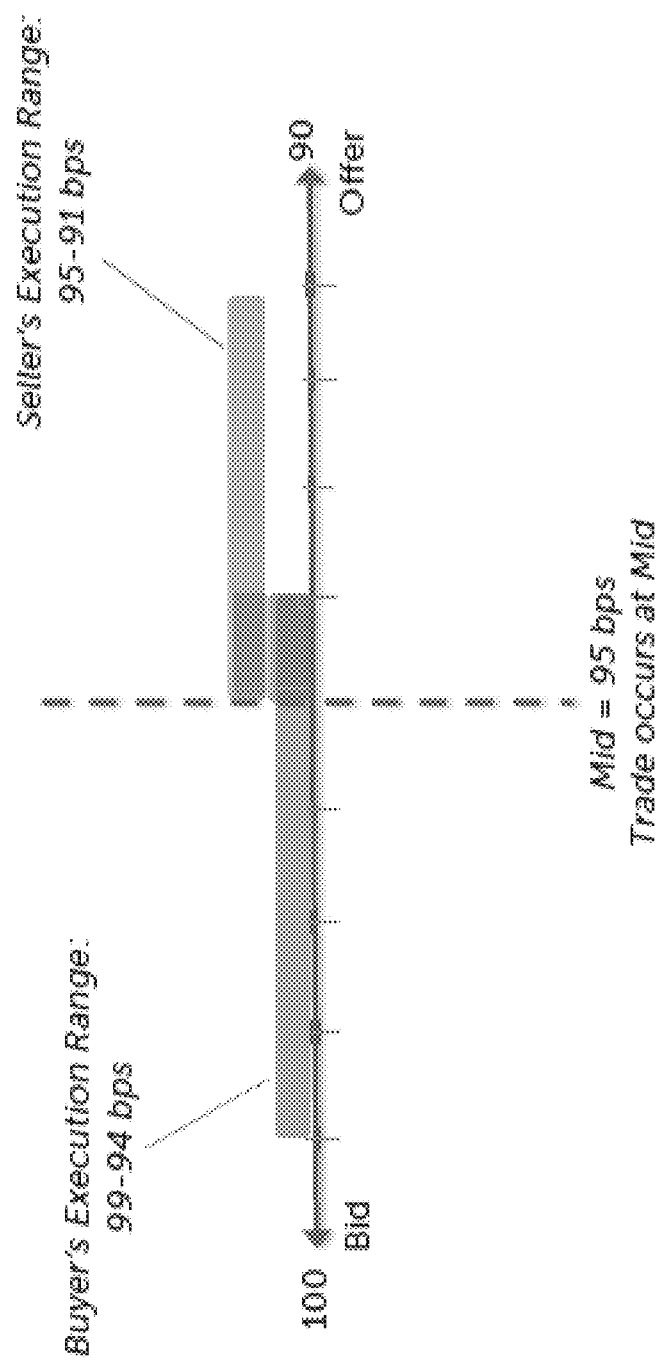

Returning to FIG. 7, if the System Mid is between the execution limits and the executions limits overlap, the trading server, in step 712, may then determine whether the System Mid is within the overlap of the execution limits. If yes, a trade at the System Mid may be automatically executed. An example of this scenario is illustrated in FIG. 8C. Here, the buyer's execution range is 99-94 bps, and the seller's execution range is 100-90 bps. The current market is 100/90 bps; therefore, the System Mid is 95 bps. Because the System Mid of 95 bps is within the overlap of the buyer's and seller's execution limits, a trade between the parties at the System Mid of 95 bps may be automatically executed/matched. An appropriate notification may then be sent to the subscribers alerting them of the trade execution.

Figure 8D:
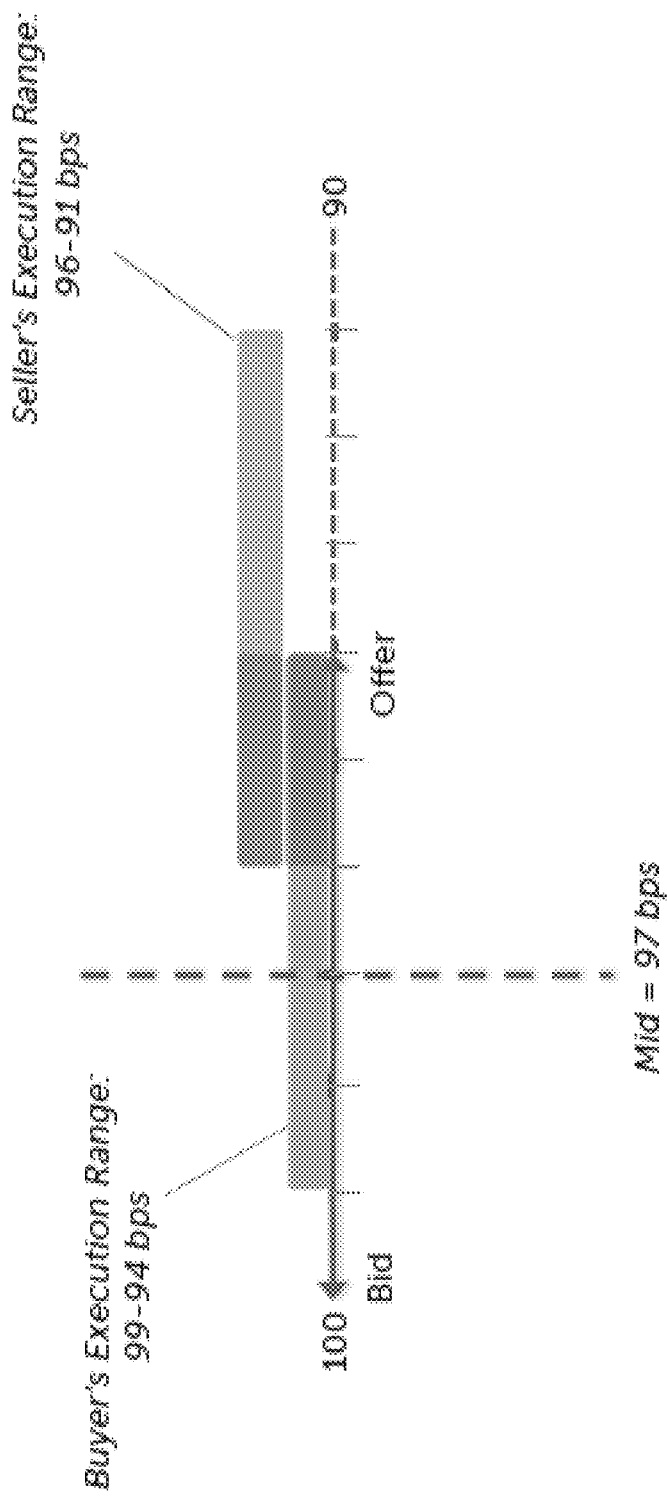

Returning to FIG. 7, if the midpoint is not within the overlap, the trading server may then determine if the midpoint can be adjusted by one party's mid flex to be within the overlap in step 716. If not, no trade is executed in step 718. An example of this scenario is illustrated in FIG. 8D. Here, the buyer's execution range is 99-94 bps, and the seller's execution range is 96-91 bps. The current market is 100/94 bps; therefore, the System Mid is 97 bps. Because the buyer has no mid flex, no trade can be executed. In this example, it is irrelevant whether or not the seller has mid flex because the System Mid is not within the seller's execution range. An appropriate notification may then be sent to the subscribers alerting them that no trade was executed.

Figure 8E:
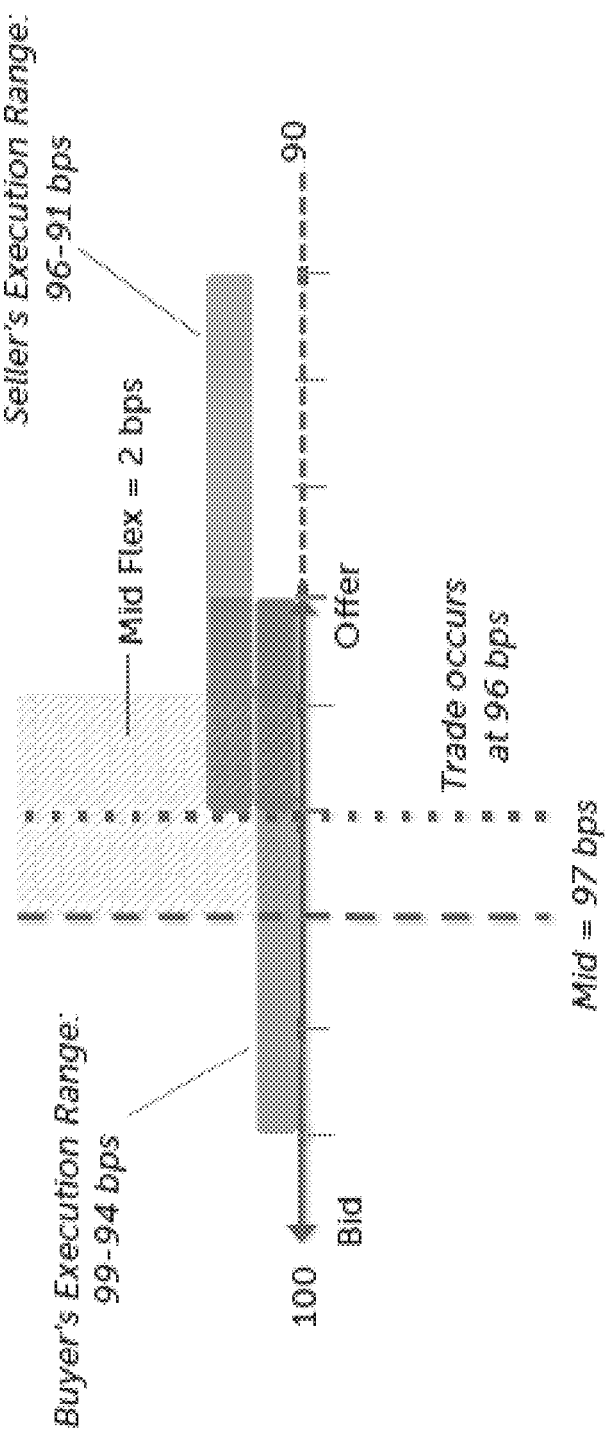
Figure 8F:
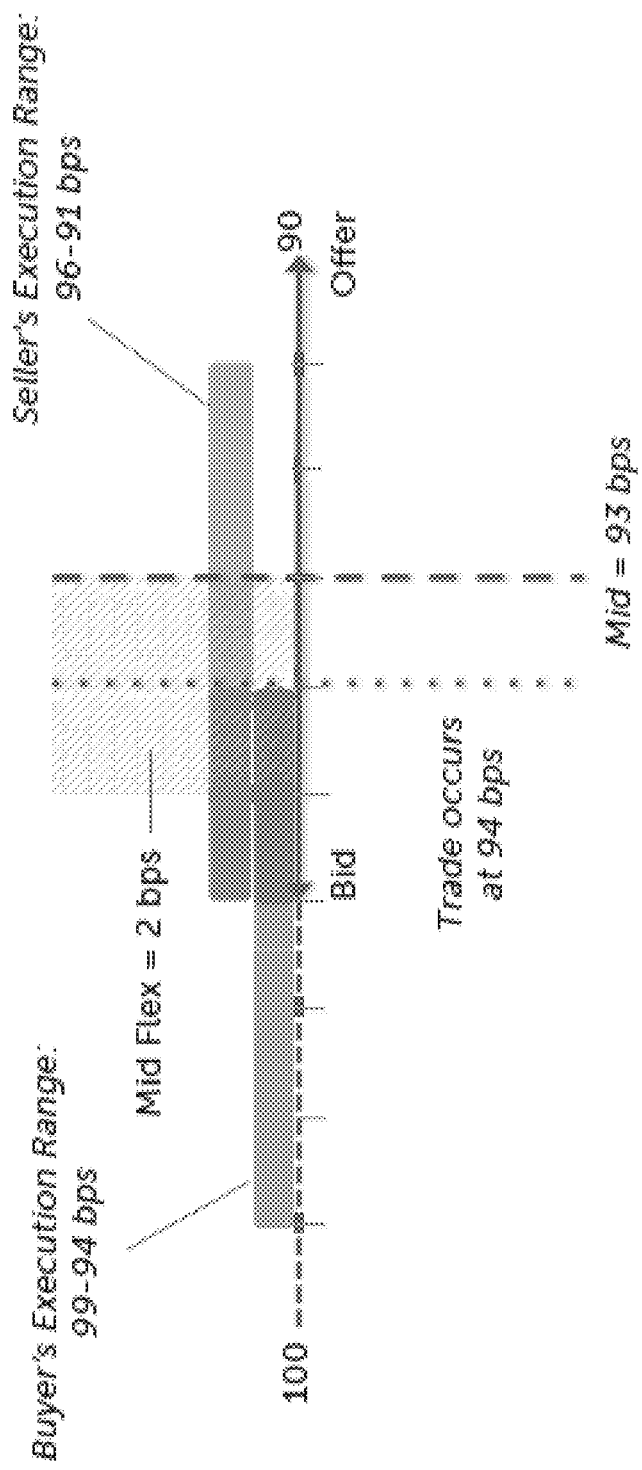

Returning to FIG. 7, if the midpoint can be adjusted by one party's mid flex to be within the overlap, a trade at a level closest to the System Mid with minimum necessary mid flex adjustment may be automatically executed. Examples of this scenario is illustrated in FIGS. 8E and 8F. In FIG. 8E, the buyer's execution range 99-94 bps, and the seller's execution range is 96-91 bps. The current market is 100/94 bps; therefore, the System Mid is 97 bps. The buyer has a mid flex of 2 bps through the System Mid. Therefore, a trade may be automatically executed at 96 bps—the level closest to the System Mid where execution ranges overlap. In FIG. 8F, the buyer's execution range 99-94 bps, and the seller's execution range is 96-91 bps. The current market is 96/90 bps; therefore, the System Mid is 93 bps. The seller has a mid flex of 2 bps through the System Mid. Therefore, a trade a may be automatically executed/matched at 94 bps—the level closest to the System Mid where execution ranges overlap. An appropriate notification may then be sent to the subscribers alerting them of the trade execution.

While an embodiment may calculate the System Mid using the above-described method, other embodiments of the present invention may also generate the System Mid using methods based on various system parameters, marketplace status, currently available bids and offers, security involved, time, parties involved, and other factors. In an embodiment, the System Mid may be calculated from third-party pricing or other market data. The method used to calculate the System Mid may also dynamically change throughout a trading session based on these and other factors.

When one or more Midpoint Orders to buy a security in aggregate satisfy the Order Parameters of one or more Midpoint Orders to sell that security (and vice-versa), the embodiments of the present invention may match such orders and initiate a Matching Session at the matched level (the "Matching Session Level"), as described in further detail below.

As described, details about a Midpoint Order on a security may not be disseminated to other subscribers, but certain information may be disseminated for the underlying security unless needed to facilitate the execution and clearance/settlement of subscriber orders or required by law or regulation. For instance, the disseminated information may indicate the existence of the Midpoint Order in the Midpoint Order Book, but not the side/direction (buy or sell), quantity, or Order Parameters of that Midpoint Order. Accordingly, embodiments of the present invention incentivize subscribers to enter unbiased, executable orders in their maximum desired size while discouraging and taming predatory behavior.

Midpoint orders in the marketplace may also be completed based on priority. For instance, a Midpoint Order that can be executed at a more aggressive level is given priority over Midpoint Orders executable at more conservative levels. Midpoint Orders at the same level-priority may be ranked by time-stamp with older Midpoint Orders having priority over newer Midpoint Orders. Other ranking methods may also be used such as based on attributes of traders, frequency of trades, network scores, etc.

In an embodiment, the trading system may further include support for "Limit Orders," which are orders to buy or sell a specified quantity of a bond at a specified level or better. A Limit Order on a price-based (spread-based) security is marketable when, for a Limit Order to buy, at the time it is entered into the System, the Limit Order is at a level equal to the current best offer or higher (lower), or for a Limit Order to sell, at the time it is entered into the System, the Limit Order is at a level equal to the best bid or lower (higher). A marketable Limit Order will be executed at or better than its specified level until its quantity is satisfied or its remaining portion is no longer marketable, at which point, the unexecuted portion of the Limit Order may remain available for trades on the system.

Figure 9:
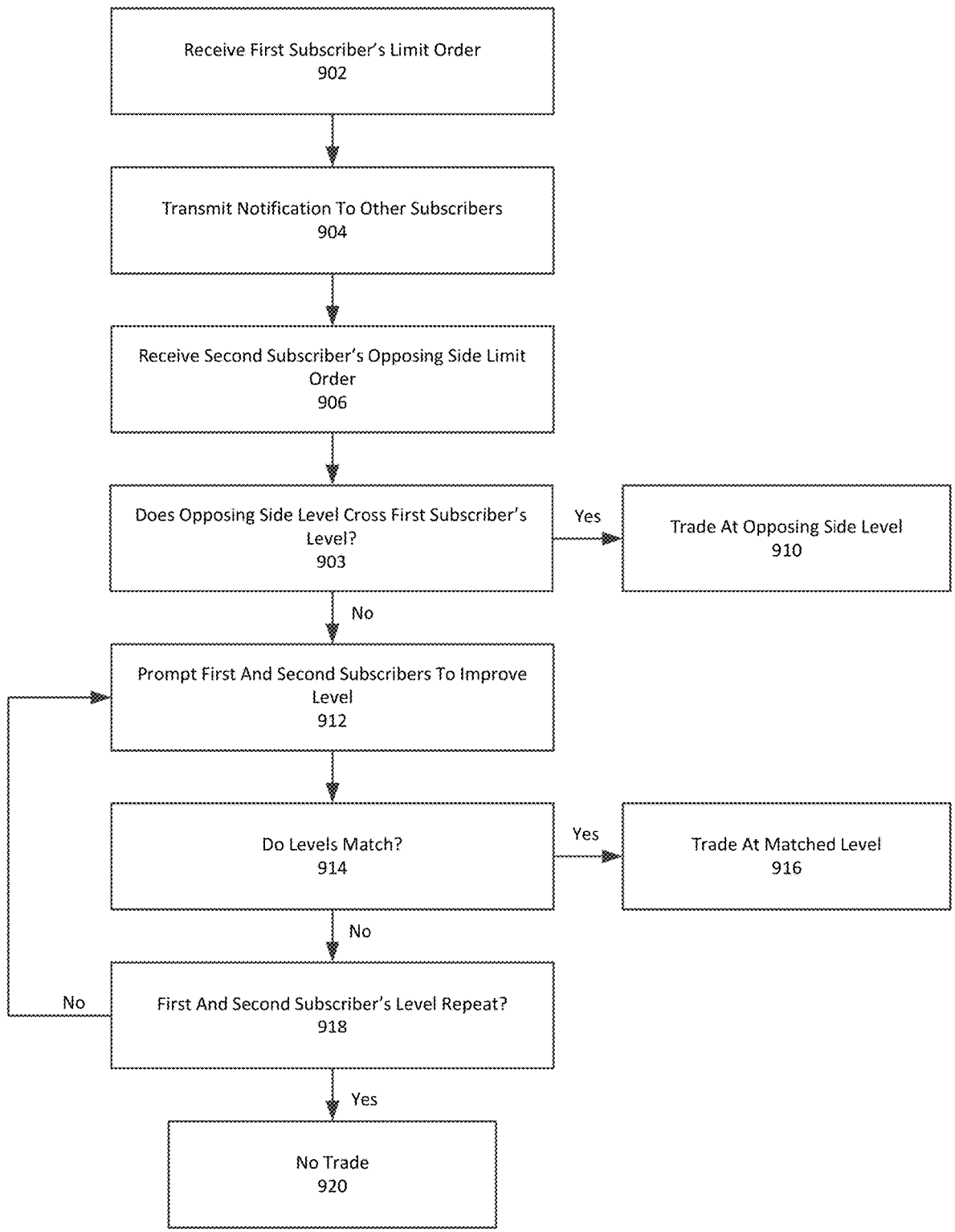
FIG. 9 is a flow diagram illustrating a limit ordering method in accordance with an embodiment of the present invention.

FIG. 9 illustrates a flow diagram for a limit ordering method in accordance with an embodiment of the present invention. In step 902, the trading server may receive a first subscriber's limit order parameters. The limit order parameters may specify the Security, Side (buy/sell), Quantity, Level, Minimum Quantity (the smallest amount of the Quantity that the subscriber will accept as a partial fill), and other Order Parameters. The trading sever may store this information and separate the order parameters into two subsets: a first subset that may be shared with other subscribers, and a second subset that may be held confidential and not be shared with other subscribers. For example, the first subset, which will be shared with other subscribers, may include only the existence of the order or show the Side of the order or the like, while the second subset, which will not be shared, may include the remaining information. In an embodiment, the first subscriber may choose what order parameters may be shared or, alternatively, the system may select what parameters may be shared based on a preselected criteria. In an embodiment, the first subscriber may also select to peg the Limit Order to a System Mid, as described above.

In step 904, the trading server may transmit notification to other relevant subscribers of the limit order. The relevant subscribers may be selected based on subscriber-designated parameters in subscriber profiles, or based on an algorithm to find interested subscribers, or may be sent to all subscribers.

In step 906, the trading server may receive at least one second subscriber's opposing side limit order. In step 908, the trading server may compare the opposing side's order level on the limit order to the first subscriber's level on the limit order. If the opposing side's level crosses the first subscriber's level, a trade between the parties may be automatically executed at the opposing side's level in step 910. An appropriate notification may then be sent to the subscribers alerting them of the trade execution.

If, however, the opposing side's level does not cross the first subscriber's level, then the trading server, in step 912, may prompt the first and second subscribers to improve their respective levels on the limit orders. The trading server, in response, may receive level quantities from the first and second subscriber, who have the option of improving their levels or repeating their prior levels. In step 914, the trading server may compare the received levels to determine whether the levels match. If yes, a trade between the parties may be automatically executed at the matched level in step 916. An appropriate notification may then be sent to the subscribers alerting them of the trade execution.

If the levels do not match, the trading server, in step 918, may then check to see if the received levels were repeated by the first and second subscriber. If both levels were not repeated, the method may return to step 912 to prompt the first and second subscribers to improve their respective levels on the limit orders. If, however, the both levels were repeated, no trade may be executed. An appropriate notification may then be sent to the subscribers alerting them that no trade was executed.

In an embodiment, Limit Orders may be completed based on priority of the orders. A Limit Order with a more aggressive level may be processed before Limit Orders with less aggressive levels, for instance. Limit Orders at the same level-priority may be ranked by time of entry with older Limit Orders having priority over newer Limit Orders. Any revision to a Limit Order may result in a new time-stamp for that Limit Order.

Figure 10A:
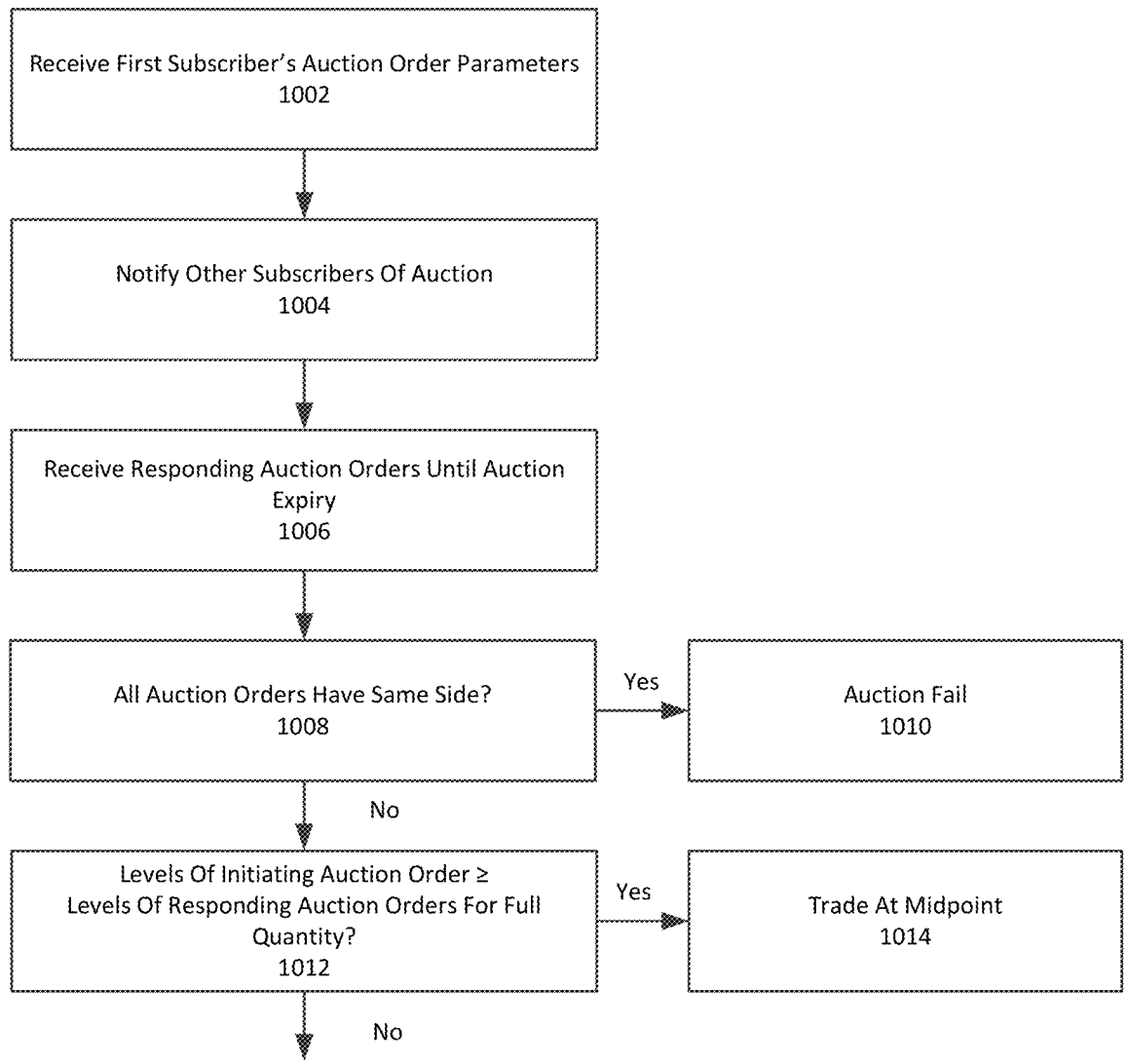
FIGS. 10A-B is a flow diagram illustrating an auction ordering method in accordance with an embodiment of the present invention.
Figure 10B:
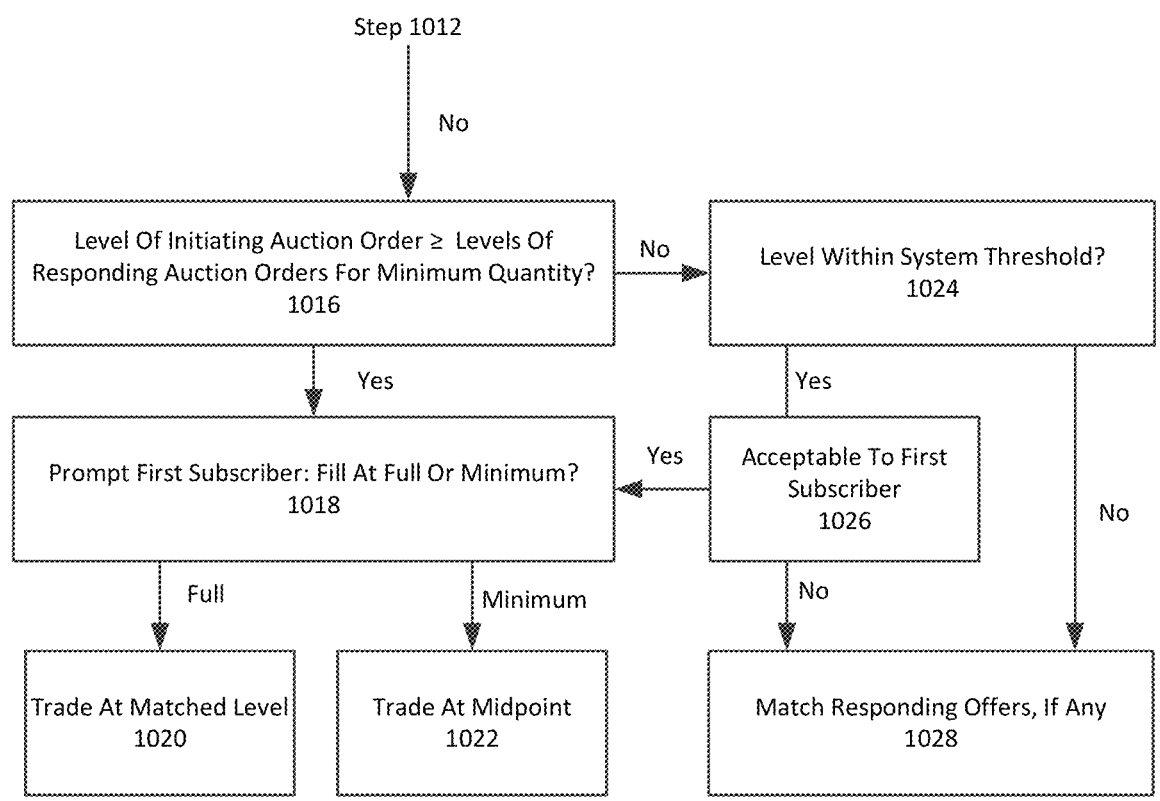

In an embodiment, the trading system may further include support for "Auction Orders." FIGS. 10A and 10B illustrate a flow diagram for an auction ordering method in accordance with an embodiment of the present invention. In step 1002, the trading server may receive a first subscriber's auction order parameters. The auction order parameters may specify specify the Security, Side (buy/sell), Quantity, an optional Level, Minimum Quantity (the smallest amount of the Quantity that the user will accept as a partial fill), and other Order Parameters. The trading sever may store this information and separate the order parameters into two subsets: a first subset that may be shared with other subscribers, and a second subset that may be held confidential and not be shared with other subscribers. For example, the first subset, which will be shared with other subscribers, may include only the existence of the order or show the Side of the order or the like, while the second subset, which will not be shared, may include the remaining information. In an embodiment, the first subscriber may choose what order parameters may be shared or, alternatively, the system may select what parameters may be shared based on a preselected criteria.

In step 1004, the trading server may transmit notification to other relevant subscribers of the auction. The relevant subscribers may be selected based on subscriber-designated parameters in subscriber profiles, or based on an algorithm to find interested subscribers, or may be sent to all subscribers.

In step 1006, the trading server may receive responding auction order(s) from other subscriber(s) until auction expiry. After auction expiry, the trading server, in step 1008, may check if all auction orders have the same Side (e.g., all buying offers or all selling bids). If all auction orders belong to the same Side, the auction may fail at step 1010. An appropriate notification may then be sent to the subscribers alerting them of the auction failure.

If the auction orders include opposing sides, the trading server, in step 1012, may compare the levels of the initiating auction order against levels of responding auction orders for size equal to the Quantity of the initiating auction order. If the level is equal to or crossed, a trade between the parties may be automatically executed at the midpoint of the initiating order's Level and the Level of the responding order that is needed to meet the Quantity in step 1014. An appropriate notification may then be sent to the subscribers alerting them of the trade execution.

If, however, the level is less than the full Quantity, the trading server, in step 1016, may compare the levels of the initiating auction order against levels of responding auction orders for size equal to the Minimum Quantity (but less than full Quantity) of the initiating auction order. If that level is equal to or crossed, the trading server, in step 1018, may prompt the first subscriber whether to fill the full Quantity at that Level or the Minimum Quantity at the level that was crossed with responding orders.

If the initiating subscriber selects the full Quantity, the trading server, in step 1020, may match/execute all relevant auction orders at the Level. An appropriate notification may then be sent to the subscribers alerting them of the trade execution. If the initiating subscriber selects to keep the match on the Minimum Quantity, the trading server, in step 1022, may match/execute all relevant auction orders at the midpoint of the initiating order's Level and the Level of the responding order that is needed to match the Minimum Quantity amount. An appropriate notification may then be sent to the subscribers alerting them of the trade execution.

If, however, the comparison of step 1026 yields that the level is less than the Minimum, the trading server, in step 1024, may check if the level of initiating order is within a System-designated threshold from the Level at which the Minimum Quantity of the initiating order can be filled. If yes, the trading server, in step 1026, may prompt the first subscriber asking if the that Level is acceptable. If that Level is acceptable, the method may move to step 1018 to prompt the first subscriber whether to fill the full Quantity at that Level or the Minimum Quantity at the level that was crossed with responding orders. If, however, that Level is not acceptable, the trading server, in step 1028, may match/execute any of the responding auction orders whose Order Parameters are satisfied by other auction orders. An appropriate notification may then be sent to the subscribers alerting them of the trade execution. Step 1028 may also be performed if level of initiating order is not within the System-designated threshold in step 1024.

In an embodiment, if the Auction has not failed and has not resulted in any Auction Orders getting matched/executed, the trading server may display the best Auction Order bid and best Auction Order offer (either for the Auction Order Minimum Quantity, or if unavailable, for whatever quantity is available) to all subscribers who entered Auction Orders in that Auction and who are within the System-designated threshold from the contra-side level that will be shown.

In an embodiment, the execution/match of a trade (such as Midpoint Orders, Limit Orders, Auction Orders, etc. described above) may suspend further trading on that security and may trigger a Matching Session to launch for a set period of time. Subscribers that are not involved in the executed trade may be provided with the opportunity to accept or dismiss to input an order matching the given price point, where available. For example, during the Matching Session, the trading server may collect Matching Session Orders from subscribers to buy or sell a user-specified Quantity of the underlying security at the System-specified Level. At the expiration of the Matching Session, the trading server may match/execute all Matching Session Orders whose Order Parameters are met.

In an embodiment of the invention, a subscriber may preset actions to be taken on notifications. For example, a subscriber may preselect execution of trades upon a receipt of a certain type of notification so that trades are automatically accepted in response the notification.

The components used in the present invention may be or include a computer or multiple computers. The components may be described in the general context of computer-executable instructions, such as program modules, being executed by a computer. Generally, program modules include routines, programs, objects, components, data structures, etc. that performs particular tasks or implement particular abstract data types.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

The computer system may include a general purpose computing device in the form of a computer including a processing unit, a system memory, and a system bus that couples various system components including the system memory to the processing unit.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by a processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system or platform.

At a minimum, the memory includes at least one set of instructions that is either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. A plurality of software processing modules may be stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD ROM or other optical media. Other removable/ nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general purpose computer, but may utilize any of a wide variety of other technologies, including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it should be appreciated that each of the processor and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol.

Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the patent claims ultimately issued from this application.

The invention claimed is:

1. An improved electronic trading system including at least one trading server, comprising:
    a computer memory storing data and instructions including a trading control program;
    a network interface for communicating with at least two subscribers over a communication network; and
    at least one computer processor executing the trading control program stored in the computer memory to perform the steps of:
        receiving, by a trading server, a first electronic message with data of a first midpoint order comprising a first set of order parameters for a security transaction from a first subscriber device running a trading application;
        storing the first set of order parameters in a data structure in the computer memory;
        separating the first set of order parameters into a first subset and a second subset;
        transmitting, by the trading server, one or more electronic messages with the first subset of the order parameters to a second subscriber device over the communication network while maintaining the second subset of the order parameters in the data structure in the computer memory;
        receiving a second electronic message with data of a second midpoint order comprising a second set of order parameters from the second subscriber device running the trading application;
        in response to receiving the first and second set of order parameters, automatically executing, by the trading server, a transaction between the first and second subscribers, wherein said transaction is a midpoint order executed at, or at a specified offset to, a system midpoint defined as a current arithmetic average of a highest bid and a lowest offer for said security;
        transmitting, by the trading server, a third electronic message with a notification to the first and second subscriber devices over the communication network, the notification configured for display on the first and second subscriber devices respectively and allowing access to information about the executed transaction;
        receiving a fourth electronic message with a selection from the first or second subscriber device regarding the executed transaction; and
        transmitting, by the trading server, information about the executed transaction to display on a user interface on the first or second subscriber device,
        wherein said trading application running on either of the first and second subscriber devices communicates with the trading server to present the user interface.

2. The electronic trading system of claim 1, wherein the first set of parameters include an order side, identity of the security, and quantity of the order.

3. The electronic trading system of claim 2, wherein the first subset of the order parameters includes the identity of the security, and the second subset of the order parameters includes the order side.

4. The electronic trading system of claim 1, wherein execution of the transaction comprises:
    comparing said system midpoint with execution limits of the first and second subscriber; and
    in the event that the execution limits of the first and second subscribers overlap and in the event the system midpoint is within the overlap of the execution limits, automatically executing the transaction at the system midpoint.

5. The electronic trading system of claim 1, wherein execution of the transaction comprises:
    comparing said system midpoint with execution limits of the first and second subscriber; and
    in the event that the execution limits of the first and second subscribers overlap but the system midpoint is not within the overlap of the execution limits, determining whether the first or second set of order parameters include a mid flex;
    in the event the first or second set of parameters includes a mid flex, adjusting the midpoint with the mid flex;
    comparing the adjusted midpoint with the overlap in the execution limits of the first and second subscriber;
    in the event the adjusted midpoint falls within the overlap, automatically executing the transaction at a minimum mid flex adjustment for the adjusted midpoint to fall within the overlap.

6. The electronic trading system of claim 1, wherein, at the execution of the transaction, all trading for the security is suspended for a predetermined period of time during which a matching session is executed by: (a) transmitting notifications to other subscribers of the executed transaction, (b) receiving orders matching a price point of the executed transaction from the other subscribers, and (c) executing at least one other transaction based on the received orders matching the price point.

7. A computer-implemented method, comprising:
    receiving, by an electronic trading system running a trading control program, a first electronic message with data of a first set of order parameters for a security transaction from a first subscriber device over a communication network, the first subscriber device running a trading application;
    storing the first set of order parameters in a data structure in a computer memory of the electronic trading system;
    separating the first set of order parameters into a first subset and a second subset;
    transmitting, by the electronic trading system running the trading control program, one or more electronic messages with the first subset of the order parameters to a second subscriber device over the communication network while maintaining the second subset of the order parameters in the data structure in the computer memory;
    receiving, by the electronic trading system running the trading control program, a second electronic message with data of a second set of order parameters from the second subscriber device running the trading application;

in response to receiving the first and second set of order parameters, automatically executing, by the electronic trading system running the trading control program, a transaction between the first and second subscribers, wherein said transaction is a midpoint order executed at, or at a specified offset to, a system midpoint defined as a current arithmetic average of a highest bid and a lowest offer for said security;

transmitting, by the electronic trading system running the trading control program, a third electronic message with a notification to the first and second subscriber devices over the communication network, the notification configured for display on the first and second subscriber devices respectively and allowing access to information about the executed transaction;

receiving a fourth electronic message with a selection from the first or second subscriber device regarding the executed transaction; and transmitting, by the electronic trading system running the trading control program, information about the executed transaction to display on a user interface on the first or second subscriber device, wherein said trading application running on either of the first and second subscriber devices communicates with the electronic trading system to present the user interface.

8. The computer-implemented method of claim 7, wherein the first set of parameters include an order side, identity of the security, and quantity of the order.

9. The computer-implemented method of claim 8, wherein the first subset of the order parameters includes the identity of the security, and the second subset of the order parameters includes the order side.

10. The computer-implemented method of claim 7, wherein execution of the transaction comprises:
comparing said system midpoint with execution limits of the first and second subscriber; and
in the event that the execution limits of the first and second subscriber overlap and in the event the system midpoint is within the overlap of the execution limits, automatically executing the transaction at the system midpoint.

11. The computer-implemented method of claim 7, wherein execution of the transaction comprises:
comparing said system midpoint with execution limits of the first and second subscriber; and
in the event that the execution limits of the first and second subscriber overlap but the system midpoint is not within the overlap of the execution limits, determining whether the first or second set of order parameters include a mid flex;
in the event the first or second set of parameters includes a mid flex, adjusting the midpoint with the mid flex;
comparing the adjusted midpoint with the overlap in the execution limits of the first and second subscriber;
in the event the adjusted midpoint falls within the overlap, automatically executing the transaction at a minimum mid flex adjustment for the adjusted midpoint to fall within the overlap.

12. The computer-implemented method of claim 7, wherein, at the execution of the transaction, all trading for the security is suspended for a predetermined period of time during which a matching session is executed by: (a) transmitting notifications to other subscribers of the executed transaction, (b) receiving orders matching a price point of the executed transaction from the other subscribers, and (c) executing at least one other transaction based on the received orders matching the price point.

13. An improved electronic trading system including at least one trading server, comprising:
a computer memory storing data and instructions including a trading control program;
a network interface for communicating with at least two subscribers over a communication network; and
at least one computer processor executing the trading control program stored in the computer memory to perform the steps of:
receiving, by the trading server, a first electronic message with data of a first set of order parameters for a security transaction from a first subscriber device running a trading application;
storing the first set of order parameters in a data structure in the computer memory;
separating the first set of order parameters into a first subset and a second subset;
transmitting, by the trading server, one or more electronic messages with the first subset of the order parameters to a second subscriber device over the communication network while maintaining the second subset of the order parameters in the data structure in the computer memory;
receiving a second electronic message with data of a second set of order parameters from the second subscriber device running the trading application;
in response to receiving the first and second set of order parameters, automatically executing, by the trading server, a transaction between the first and second subscribers, wherein the transaction is a midpoint order and the first set of parameters include an order side, identity of the security, and quantity of the order, and wherein execution of the transaction comprises comparing a system midpoint with execution limits of the first and second subscriber;
transmitting, by the trading server, a third electronic message with a notification to the first and second subscriber devices over the communication network, the notification configured for display on the first and second subscriber devices respectively and allowing access to information about the executed transaction;
receiving a fourth electronic message with a selection from the first or second subscriber device regarding the executed transaction; and
transmitting, by the trading server, information about the executed transaction to display on a user interface on the first or second subscriber device,
wherein said trading application running on either of the first and second subscriber devices communicates with the trading server to present the user interface.

14. A computer-implemented method, comprising:
receiving, by an electronic trading system running a trading control program, a first electronic message with data of a first set of order parameters for a security transaction from a first subscriber device over a communication network, the first subscriber device running a trading application;
storing the first set of order parameters in a data structure in a computer memory of the electronic trading system;
separating the first set of order parameters into a first subset and a second subset;

transmitting, by the electronic trading system running the trading control program, one or more electronic messages with the first subset of the order parameters to a second subscriber device over the communication network while maintaining the second subset of the order parameters in the data structure in the computer memory;

receiving, by the electronic trading system running the trading control program, a second electronic message with data of a second set of order parameters from the second subscriber device running the trading application;

in response to receiving the first and second set of order parameters, automatically executing, by the electronic trading system running the trading control program, a transaction between the first and second subscribers, wherein the transaction is a midpoint order and the first set of parameters include an order side, identity of the security, and quantity of the order, and wherein execution of the transaction comprises comparing a system midpoint with execution limits of the first and second subscriber;

transmitting, by the electronic trading system running the trading control program, a third electronic message with a notification to the first and second subscriber devices over the communication network, the notification configured for display on the first and second subscriber devices respectively and allowing access to information about the executed transaction;

receiving a fourth electronic message with a selection from the first or second subscriber device regarding the executed transaction; and transmitting, by the electronic trading system running the trading control program, information about the executed transaction to display on a user interface on the first or second subscriber device, wherein said trading application running on either of the first and second subscriber devices communicates with the electronic trading system to present the user interface.

* * * * *